United States Patent Office 3,479,345
Patented Nov. 18, 1969

1

3,479,345
CURCUMIN DERIVATIVES
Charles F. Geschickter, Lorton, Va., and Jacob R. Meadow, Lexington, Ky., assignors to The Geschickter Fund for Medical Research, Inc., Washington, D.C., a corporation of New York
No Drawing. Filed July 1, 1966, Ser. No. 562,128
Int. Cl. C09b 23/00
U.S. Cl. 260—240                   4 Claims

ABSTRACT OF THE DISCLOSURE

Novel di-Mannich derivatives of curcumin having the formula

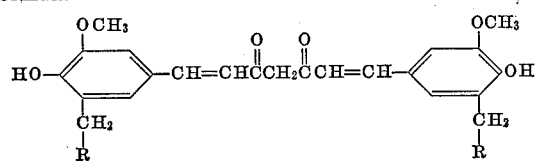

wherein R is $(C_4H_9)_2N-$

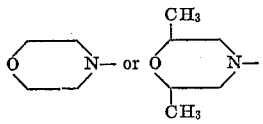

and therapeutically useful acid addition salts thereof have utility for prevention of dribbling, irritable colon and in the treatment of nocturia.

This application relates to curcumin derivatives and more particularly to di-Mannich derivatives of curcumin.

It is an object of the present invention to provide novel di-Mannich derivatives of curcumin.

It is another object of the present invention to provide novel di-Mannich derivatives of curcumin and their therapeutically useful acid addition salts, which are particularly useful for therapeutic purposes and especially for the prevention of dribbling, irritable colon and in the treatment of nocturia.

It is a still further important object of the present invention to provide di-Mannich derivatives of curcumin with morpholine, dimethylmorpholine and di-n-butyl amine and their therapeutically useful acid addition salts.

These and other important objects of the present invention will become more apparent in accordance with the ensuring description and appended claims.

The novel di-Mannich derivatives of curcumin to which the present invention is directed have the following general formula:

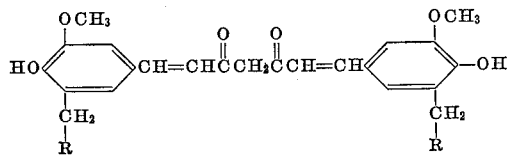

In the above formula, R represents any one of dibutylamino, morpholino or 2,6-dimethylmorpholino, the nitrogen atom of R being attached directly to the $CH_2$ group. Thus, the following specific compounds are embraced within the framework of the present invention:

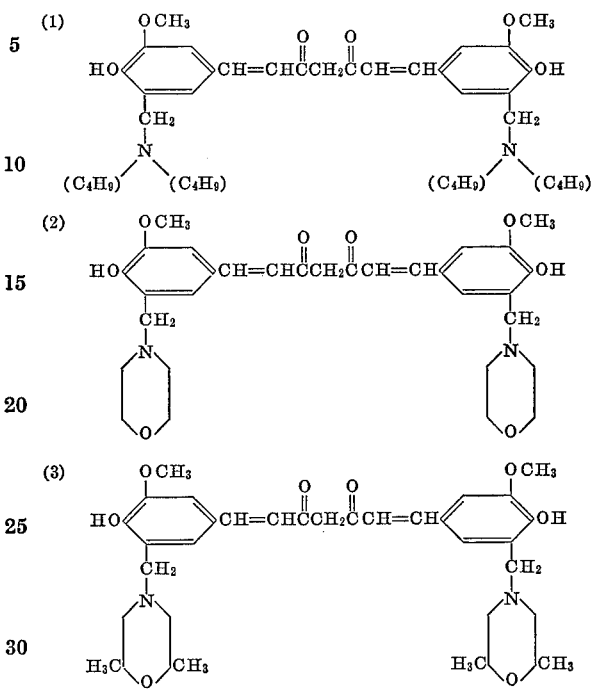

The compounds of the present invention are prepared by the well known Mannich reaction from curcumin, as illustrated by the following three examples.

EXAMPLE 1

Preparation of di-Mannich derivative of curcumin with morpholine

Seven and four-tenths grams (0.02 mole) of curcumin (Number 1179, M.P. 179–181° C., from Eastman Kodak Co.) were dissolved in 50 milliliters of absolute ethyl alcohol and placed in a 125-ml. RB flask with ground glass joint. The contents were then cooled in an ice bath and 6.1 grams of purified morpholine (0.07 mole) were added slowly to the cold solution. Six and three-tenths grams (or 0.07 mole) of a solution of 37% aqueous formaldehyde were then added dropwise over a period of fifteen or twenty minutes while the solution remained in an ice bath. The mixture was stoppered and allowed to remain at room temperature for several hours before attaching to a reflux condenser. The mixture was then gently refluxed for a period of 10 hours using a Glascol heating element. The excess alcohol and other volatile components were removed by distillation or open evaporation on a steam bath until a thick, brown gummy residue remained. This was taken up with twice its volume of methyl alcohol and evaporated again to a residue on the steam bath. The residue was then dissolved in about 50 ml. of methyl alcohol and the warm solution was slowly poured with constant stirring into a total of two liters of cold distilled water and allowed to settle at room temperature for at least 24 hours or longer. Excess water was then decanted from the orange-yellow precipitate and the latter was filtered by suction through a porous fritted-glass funnel. This was quickly washed with three 100-ml. portions of fresh, warm distilled water and allowed to dry at room temperature for 24 to 36 hours. The resulting yellow powder melted indefinitely between 154 and 160° C. The yield of dried yellow product was 10.2 grams, or about 90% of theory.

EXAMPLE 2

Preparation of di-Mannich derivative of Curcumin with dimethylmorpholine

The preparation of this derivative was similar to that involved in the preceding example. Eleven and one-tenth grams (0.03 mole) of curcumin, 12.0 grams (0.105 mole) of 2,6-dimethylmorpholine, and 9.5 grams (0.105 mole) of aqueous 37% formaldehyde were mixed as directed in Example 1. After being permitted to stand at room temperature 12 hours or longer, the dark reddish-brown mixture was allowed to reflux for about 8 hours. The solution was then evaporated to a dark gummy residue as before, taken up with 40 ml. of methyl alcohol and again evaporated on the steam bath to a gummy residue. At this point, 50 ml. of warm methyl alcohol was added and the solution was poured slowly with constant stirring into about two liters of cold distilled water. The orange-yellow precipitate was alowed to settle overnight and the water with impurities was decanted from the product. The latter was washed three times with 200-ml. portions of fresh warm distilled water, filtered by suction on a fritted glass funnel and then dried on a large piece of filter paper at room temperature for at least 24 hours. This product was less colloidal than the morpholine compound when washed with water and could be worked up a little more rapidly. Weight of the product was 14.5 grams, or about 78% of theory. The yellow compound was quite soluble in a wide variety of organic solvents. The melting point was indefinite and ranged between 130 and 138° C.

EXAMPLE 3

Preparation of di-Mannich derivative of curcumin with di-n-butyl amine

A mixture of 3.7 grams (0.01 mole) of curcumin, 4.6 grams (0.035 mole) of di-n-butyl amine and 25 ml. of absolute ethanol was placed in a round bottom flask and chilled in an ice bath. To this was slowly added with stirring 0.035 mole of 37% aqueous formaldehyde solution weighing 3.2 grams. The temperature of the mixture was allowed to rise to room temperature for about an hour, after which the flask was attached to a reflux condenser and the contents refluxed about nine hours. The reaction mixture was then concentrated to a gummy residue by evaporation of the solvent on a hot water bath. The residue was dissolved in a minimum quantity of dilute hydrochloric acid, filtered and the filtrate diluted with addition of 400 ml. of distilled water. The pH of this solution was slightly acidic, i.e., about 3 or 4. Dilute ammonium hydroxide was then added with vigorous stirring to produce an orange-colored precipitate. The resulting product was washed carefully several times with fresh distilled water, filtering each time on a Buchner funnel. When dried, the tan-colored product weighed 4.6 grams and had an incipent melting point in the range of 65–70° C. The derivative was easily soluble in dilute HCl and other dilute acids, such as dimethanesulfonamide.

The novel compounds of the present invention are useful for pharmaceutical purposes, particularly in the treatment of nocturia and for the prevention of dribbling and irritable colon. The $LD_{50}$ in rats of the morpholino di-Mannich derivative is about 400 mg./kg.; that of the 2,6-di-methylmorpholino di-Mannich derivative and of the dibutyl amino di-Mannich derivative is about 300 mg./kg.

The novel compounds of the present invention may be used in the treatment of nocturia, dribbling and irritable colon in aqueous solution containing about 50 mg./cc. for intramuscular injection and as a powder for oral use in capsules containing about 80–100 (preferably about 80) mg./capsule.

The compounds of the present invention can be used in their free base form or in the form of their non-toxic simple acid addition salts, examples of which are the chlorides, iodides, bromides, sulfates, acetates, succinates, maleates, phosphates, benzoates, lacetates and the like. In general, those non-toxic salts which are soluble in water or other well-tolerated solvents are particularly useful for therapeutic purposes due to ease of administration of the salts in their dissolved form.

The invention may be embodied in other specific forms without departing from the spirit or essential characteristics thereof. The present embodiment is therefore to be considered in all respects as illustrative and not restrictive.

What is claimed is:

1. A compound of the formula

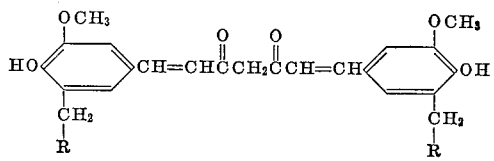

wherein R is $(C_4H_9)_2N-$,

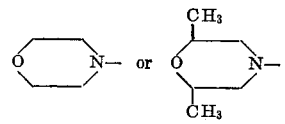

the nitrogen atom of R being attached directly to said $CH_2$ group; and the therapeutically useful acid addition salts of said compound.

2. A compound as defined in claim 1 wherein R is $(C_4H_9)_2N-$.

3. A compound as defined in claim 1 wherein R is

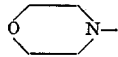

4. A compound as defined in claim 1 wherein R is

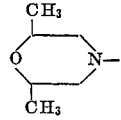

References Cited

Beilstein's Handbüch der Organoischen Chemie, 4th ed., vol. 8, pp. 757–758 (System No. 852–853) Von Springer, Berlin, Germany (1931).

JOHN D. RANDOLPH, Primary Examiner

U.S. Cl. X.R.

260—570.9, 999